(12) United States Patent
Candido De Lima Junior et al.

(10) Patent No.: US 11,341,241 B2
(45) Date of Patent: May 24, 2022

(54) ENHANCING MEMORY SAFE PROGRAMMING USING A PAGE FRAME TAG MECHANISM

(71) Applicant: International Business Machines Corporation, Armonk, NY (US)

(72) Inventors: Juscelino Candido De Lima Junior, Sao Paulo (BR); Carlos Eduardo Seo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/678,904

(22) Filed: Nov. 8, 2019

(65) Prior Publication Data

US 2021/0141899 A1 May 13, 2021

(51) Int. Cl.
*G06F 21/56* (2013.01)
*G06F 12/14* (2006.01)
*G06F 21/54* (2013.01)
*G06F 8/41* (2018.01)

(52) U.S. Cl.
CPC .............. *G06F 21/566* (2013.01); *G06F 8/41* (2013.01); *G06F 12/1433* (2013.01); *G06F 21/54* (2013.01); *G06F 2212/1052* (2013.01); *G06F 2221/033* (2013.01)

(58) Field of Classification Search
CPC ...... G06F 21/566; G06F 8/41; G06F 12/1433; G06F 21/54; G06F 2212/1052; G06F 2221/033
See application file for complete search history.

(56) References Cited

U.S. PATENT DOCUMENTS

| 5,619,671 | A | 4/1997 | Bryant et al. |
| 7,272,832 | B2 | 9/2007 | Gardner |
| 10,055,592 | B2 | 8/2018 | Baji-Gal |
| 10,878,081 | B2 * | 12/2020 | Singh ..................... G06F 21/52 |
| 2013/0166922 | A1 | 6/2013 | Wong et al. |
| 2017/0213039 | A1 * | 7/2017 | Werner ................... G06F 21/53 |
| 2018/0095902 | A1 | 4/2018 | Lemay et al. |
| 2018/0307838 | A1 | 10/2018 | Sharma et al. |

OTHER PUBLICATIONS

Li et al., "Zipper Stack: Shadow Stacks Without Shadow," eprint, arXiv:1902.00888v2 [cs.CR] Feb. 13, 2019, 16 pages.
Corbet, Jonathan, "Memory Protection Keys", LWN.net, May 13, 2015.

(Continued)

*Primary Examiner* — Paul E Callahan
(74) *Attorney, Agent, or Firm* — Patterson + Sheridan, LLP

(57) ABSTRACT

A technique for mitigating against return-oriented programming (ROP) attacks that occur during execution of an application includes receiving source code to compile into an executable application. During a compilation of the source code, one or more functions within the source code that are associated with gadgets in an ROP attack are determined, each of the one or more functions is assigned to one or more protected pages of memory for the executable application, and a tag is assigned to each of the one or more functions. The tag for each function maps to the protected page of memory to which the function is assigned.

20 Claims, 8 Drawing Sheets

(56) References Cited

OTHER PUBLICATIONS

Ubuntu Manpage: pkeys—"Overview of Memory Protection Keys", Ubuntu Manpage Repository, Canonical Ltd., 2019.
Return Oriented Programming (ROP) Exploit Explained, Rapid 7, Aug. 17, 2016.
Return Oriented Programming (ROP) Attacks, posted in Exploit Development, Feb. 9, 2019, INFOSEC Resources 2019.
Intel 64 and IA-32 Architectures Software Developer's Manual—Combined vols. 1, 2A, 2B, 2C, 2D, 3A, 3B, 3C, 3D and 4, Intel Corporation, May 2019.
Corbet, Jonathan "System Calls for Memory Protection Keys", LWN.net, Jun. 2, 2016.

\* cited by examiner

ENHANCING MEMORY SAFE PROGRAMMING USING A PAGE FRAME TAG MECHANISM

BACKGROUND

The present invention relates to computer security, and more specifically, techniques for using a page frame tag mechanism to mitigate return oriented programming (ROP) attacks.

Software programs (or applications) may, in some cases, be vulnerable to various kinds of exploits. These exploits, e.g., may allow for the injection and execution of malicious code into a program, privilege escalation that allows the program to perform actions that may normally be restricted to system administrators, leak data, and the like. Some of these exploits may allow unauthorized users to access data on a computer system and exfiltrate that data.

One common exploit involves attacking the execution flow of a program by modifying the call stack. The call stack, for example, is an essential data structure that is used and maintained throughout the execution of applications. The execution flow (of a program) can be controlled by pushing the called functions' return addresses onto the stack. Malicious actors can therefore manipulate the call stack to redirect the execution of a program to run arbitrary code. ROP is one example of a commonly used exploit that involves modifying the call stack. In an ROP exploit, a malicious actor typically uses multiple pieces of existing code (commonly referred to as "gadgets") to run a shellcode. For example, the malicious actor can manipulate the return address on the stack to execute a gadget by replacing the value of the return address to that of an address for the gadget. When chained together, these actions allow the malicious actor to perform arbitrary operations that compromise the execution flow of the program.

Conventional techniques that are used to defend against ROP techniques generally involve the implementation of address space layout randomization or control flow integrity systems. Address space layout randomization, for example, involves randomly arranging the address space positions of data areas of processes, in order to prevent an attacker from reliably jumping to exploited functions in memory. Control flow integrity systems typically employ techniques that involve preventing the control flow itself from being exploited. These conventional techniques, however, are associated with high runtime overhead, limited hypervisor support, etc. Additionally, implementing these techniques may involve significant amounts of labor-intensive code refactoring.

SUMMARY

One embodiment presented herein describes a method for mitigating against a return oriented programming (ROP) attack that occurs during execution of an application. The method generally includes receiving source code to compile into an executable application. The method also includes, during a compilation of the source code, determining one or more functions within the source code that are associated with gadgets in an ROP attack, and assigning each of the one or more functions to one or more protected pages of memory for the executable application. The method further includes, during the compilation of the source code, assigning a tag to each of the one or more functions. The tag for each function maps to the protected page of memory to which the function is assigned.

Other embodiments include, without limitation, a computer program product that includes a storage medium having computer-readable program code that enables a processing unit to implement one or more aspects of the disclosed methods as well as a computing system having a processor, memory, and application programs configured to implement one or more of the disclosed methods.

BRIEF DESCRIPTION OF THE SEVERAL VIEWS OF THE DRAWINGS

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Embodiments described herein provide methods, processing systems, and computer-readable mediums for using a page frame tag mechanism that is supported within hardware of a computing system to mitigate return oriented programming (ROP) attacks on software applications.

For example, some computing systems may support a memory protection key feature, which allows protection keys to be assigned to memory pages for access control purposes. With this feature enabled, a set of bits (e.g., four bits) in each page table entry can be used to assign one of a set (e.g., sixteen) of key values to any given page. These key values can be used to enforce page-based protections. For example, a computing system that supports this feature can use a register with two bits for each key value to control write and read attempts to a given page. Setting the "write disable" bit for a given key blocks attempts to write a page with that key value. Similarly, setting the "access disable" bit for a given key blocks attempts to read a page with that key value.

Embodiments described herein can leverage the memory protection key feature (typically used to enforce page-based protections) within a computing system in order to mitigate ROP attacks. More specifically, embodiments can use the memory protection key feature to assign tags to each function in protected page frames, so that the program executes and runs in a particular order. In one embodiment described in more detail below, during compile time of source code, a compiler can identify a set of functions within source code that are associated with ROP attacks (e.g., high-risk functions that are susceptible to being used as gadgets in a ROP attack), assign the identified set of functions in protected page frames (e.g., protected with a memory protection key), and assign a tag to each function. By assigning high-risk functions to protected page frames in this manner, embodiments can mitigate exploits that attempt to modify the execution of the program. For example, embodiments can prevent a malicious actor from leveraging gadgets to build a ROP attack, since a program protected using the techniques presented herein will not execute if a called marked function has an incorrect tag.

Figure 1:
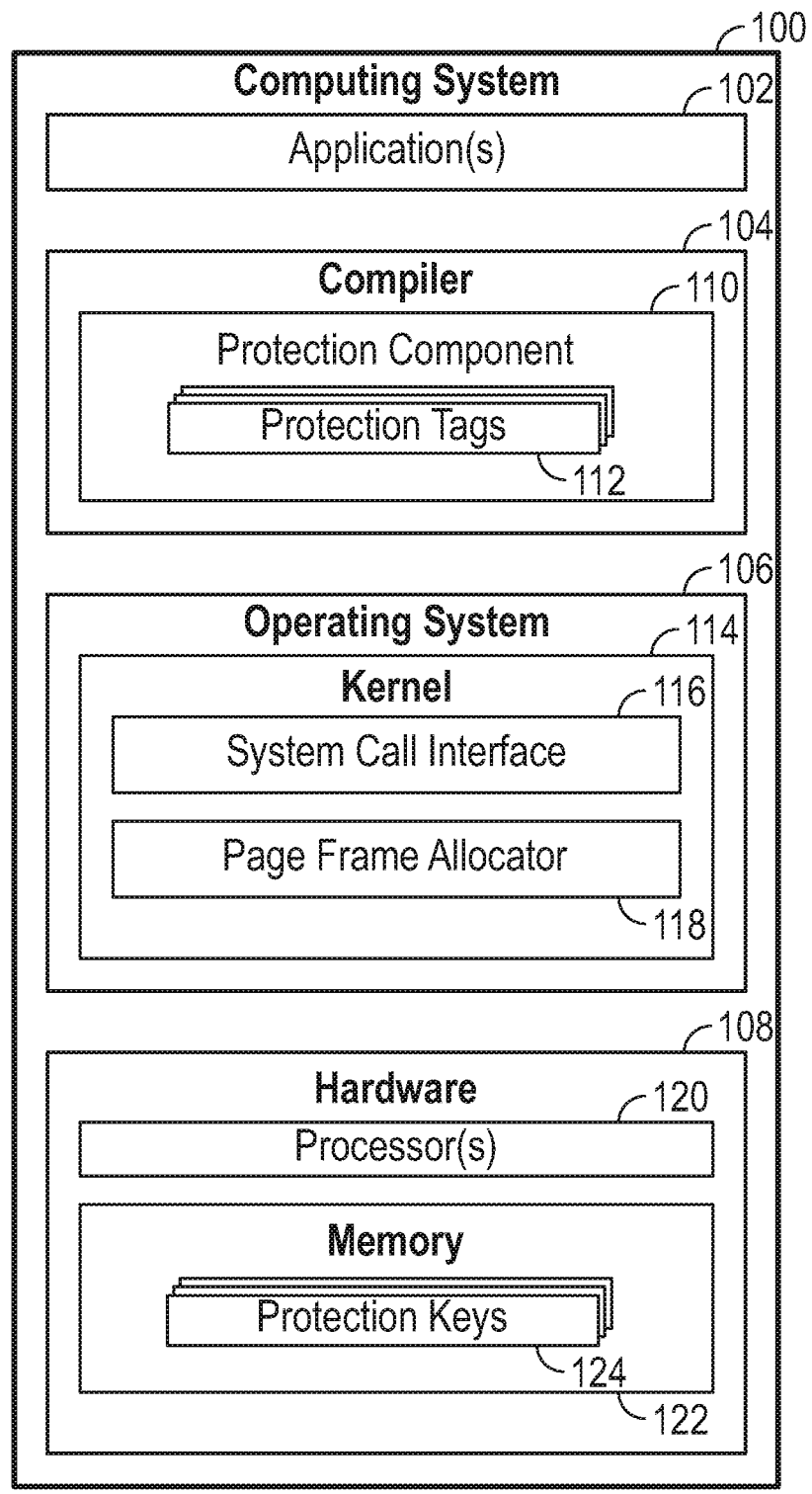
FIG. 1 illustrates an example computing system configured with a protection component, according to one embodiment.

FIG. 1 illustrates an example computing system 100 configured with a protection component 110, according to one embodiment. The computing system 100 includes one or more applications 102, a compiler 104, an operating system 106, and hardware 108. The computing system 100 is representative of a various computing devices, including, for example, a desktop computer, laptop computer, mobile device, tablet computer, etc. The hardware 108 includes processor(s) 120 and memory 122. The processor(s) 120 may represent one or more processors (e.g., microprocessors, central processing units (CPUs), etc.) or multi-core processors. The processor(s) 120 may include various registers, buffers, memories, and other units formed by integrated circuitry, and may operate according to reduced instruction set computing ("RISC") techniques. The memory 122 may include a variety of computer readable media, including, for example, volatile and/or non-volatile media, removable and/or non-removable media, etc. The memory 122 may include one or more caches, random access memory, read-only memory, etc. In addition, the memory 122 may include memory physically located in the computing system 100 or on another computing device coupled to the computing system 100.

The computing system 100 operates under the control of the operating system 106, which is responsible for running applications 102 and managing the applications 102 access to hardware 108. The operating system 106 generally represents any operating system, with examples including versions of Microsoft® Windows®, Linux® and Unix® distributions, and so on. As shown, the operating system 106 includes a system call interface 116 and a page frame allocator 118 located in the kernel 114 of the operating system 106. The application(s) 102 can request services (e.g., make system calls) from the operating system 106 via the system call interface 116. The request for services can include request for one or more processes, requests for the creation and execution of new processes, requests for access to various hardware devices (e.g., certain peripheral devices, etc.), requests for communication services, and others. The application 102 can be implemented as a set of instructions stored in memory 122 and the processor(s) 120 can be configured to execute the instructions to perform a specified task or series of tasks. The page frame allocator 118 can allocate and/or deallocate memory to application processes based on their needs. In one embodiment, the page frame allocator 118 can maintain a list of free pages of real memory, from which it can allocate to the application processes.

In embodiments herein, the computing system 100 supports a memory protection key mechanism, which allows one or more protection keys (pkeys) 124 to be assigned to memory pages (e.g., allocated by the page frame allocator 118) for access control purposes. Using this mechanism, a given application (or process) 102 can configure its memory into multiple regions and selectively disable or enable access to any of those regions. For example, a protection key 124 is generally a multi-bit value (e.g., four bits) that can be stored in the page-table entry for each page in an application's address space. Thus, assuming a protection key 124 is a four-bit value, pages can be assigned to one of sixteen key values. For each of these keys, the application 102 can configure the processor(s) 120 to deny write operations or read operations to the respective memory page protected by the key. In one example, an application 102 can obtain a protection key 124 via the system call interface 116 with a system call "pkey_alloc( )" which returns an integer index indicating which key was allocated. The application 102 can assign a key to a given page via the system call interface 116 with a system call "pkey_mprotect( )" The application 102 can use the system call "pkey_free( )" to allocate or free a protection key and make it available for later allocations.

Figure 2:
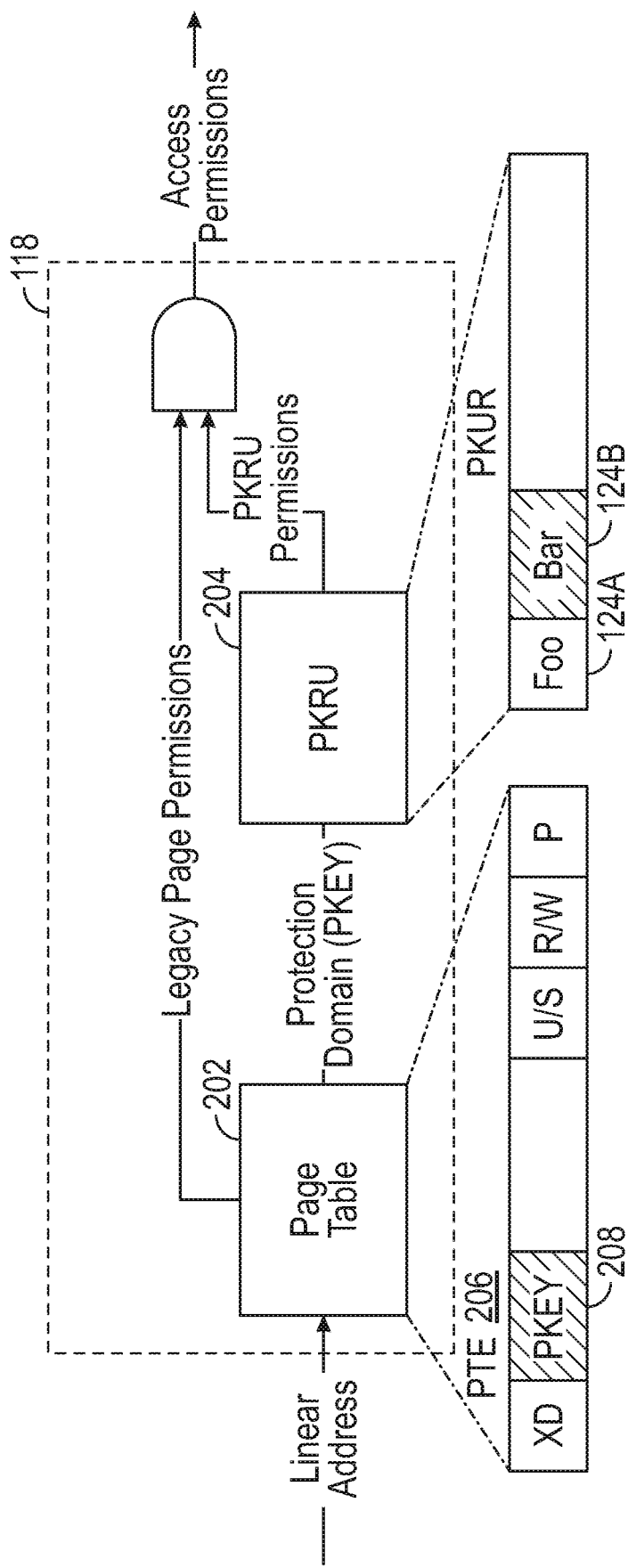
FIG. 2 illustrates an example implementation of a memory protection key mechanism within a computing system, according to one embodiment.

FIG. 2 depicts one example implementation of the memory protection key mechanism, according to one embodiment. Here, the page frame allocator 118 includes a page table 202 and a protection key rights for user pages (PKRU) register 204. The page table 202 includes one or more page table entries 206, each of which can be assigned a protection key 124. The PKRU register 204 is a control register that includes two separate bits (e.g., an access disable bit and a write disable bit) for each protection key 124. In this example, the PKRU register 204 includes two separate bits for a first protection key 124A ("foo") and a second protection key 124B ("bar").

The PKRU register 204 can determine, for each protection key 124, whether the memory page (of the page table entry 206) associated with that protection key 124, can be accessed (e.g., read from or written to). In this particular example, the page table entry 206 includes a protection key field 208 for a protection key 124, which applies to user level pages (e.g., U/S=1). The protection key 124 within the protection field 208 is used as an index to the PKRU 204. Access permission to the memory page is then determined based the legacy page permissions (from the page table entry 206) and the PKRU permissions for the protection key 124 (associated with the page table entry 206). If, for example, the PKRU permissions deny access to a given memory page, the application 102 may be denied access to that memory page. Similarly, direct memory accesses to that memory page from the kernel 114 may also be rejected.

Referring back to FIG. 1, the compiler 104, in general, can translate source code from a high level programming language (e.g., C, C+, etc.) to a lower level language (e.g., assembly, object code, machine code, etc.) in order to create an executable program (e.g., application 102). Note that while the FIG. 1 depicts the compiler 104 within the computing system 100, in other embodiments, the compiler 104 can be located within another computing system. In some embodiments, the compiler 104 can be located in a computing system hosted in a cloud computing environment (not shown). In one example, the application 102 can make use of functions either coded into the program itself or as part of a library (e.g. C library (libc)) stored in the memory 122. Functions may be defined within applications 102 (or programs) or separately in libraries that can be used by multiple applications. A function is often coded so that it can be started or called several times and from several places during execution of an application 102, including from other functions, and then branch back or return to the next instruction after the call, once the task is complete. A function can also be referred to as a procedure, a subroutine, a routine, a method, a subprogram, etc.

A processor 120 may use a call stack to implement function calls and returns. For example, each function call creates a new entry, or stack frame, at one end of the stack. When the function returns, the stack frame is deleted from the stack, and the space may be used for other function calls. Each stack frame can include the private data (e.g., parameters and internal variables) of the corresponding call and the return address (e.g., the address of the instruction after the call). A call stack is used to keep track of the point to which each active function should return control when it finishes executing. An active function, for example, is one that has been called but is yet to complete execution after which control should be handed back to the point of the call, or calling function.

A function may also include a function prologue and a function epilogue that bracket the body of the function and can be used to manipulate the stack. For example, the function prologue appears at the beginning of the function and prepares the stack and registers for use within the function. Similarly, the function epilogue appears at the end of the function and restores the stack and registers to the state they were in before the function was called. The function epilogue typically includes the function exit point or return instruction such as the "ret" in x86 assembly language.

As noted, a malicious actor often uses multiple gadgets in an ROP attack to manipulate the call stack and alter the program execution. As used herein, a gadget refers to a sequence of instructions that provides an operation for a return-oriented program. Each gadget may end in a return instruction (e.g., x86 RET instruction). As an example, "move eax. 10: ret" is a gadget which sets eax to 10 (decimal). The gadgets are typically sequences of instructions that can be found in memory (e.g., the address space) of the application 102. One example source of such gadgets is a library, such as libc, accessible to the application 102. Malicious actors can often identify the sequences of instructions that can be used as gadgets from analyzing the binary code of programs or libraries of an operating system. In general, any instruction sequence ending in a target address that can be determined at runtime, such as a return instruction, can be potentially used as a gadget. Examples of frequently used gadgets include gadgets that store and load data from one place to another (e.g., register to register, register to memory, memory to register, etc.), gadgets that perform arithmetic operations (e.g., ADD, SUB, MUL, DIV XOR, rotates, shifts, etc.), etc.

In some cases, the malicious actor can execute the ROP attack in the form of a return-oriented program. The return-oriented program, for example, can include one or more gadgets arranged in a particular order, such that, when executed, carry out the intended behavior of the malicious actor. A payload with the gadgets may be placed in the memory of the exploited application (e.g., application 102), and the stack pointer can be redirected to point to the first gadget. In one example, this can be accomplished with a buffer overflow of the stack. The gadget frames are typically placed on the overflowed stack so that the first gadget has overwritten the saved instruction pointer of some function. When that function attempts to return, the return-oriented program is executed instead. Each gadget in the return-oriented program is constructed, such that when the return instruction in the last instruction of the sequence of the gadget is executed, the stack pointer points to the next gadget to be executed. In this manner, the return-oriented program will execute one gadget after another, altering the intended execution flow of the application 102.

Figure 3:
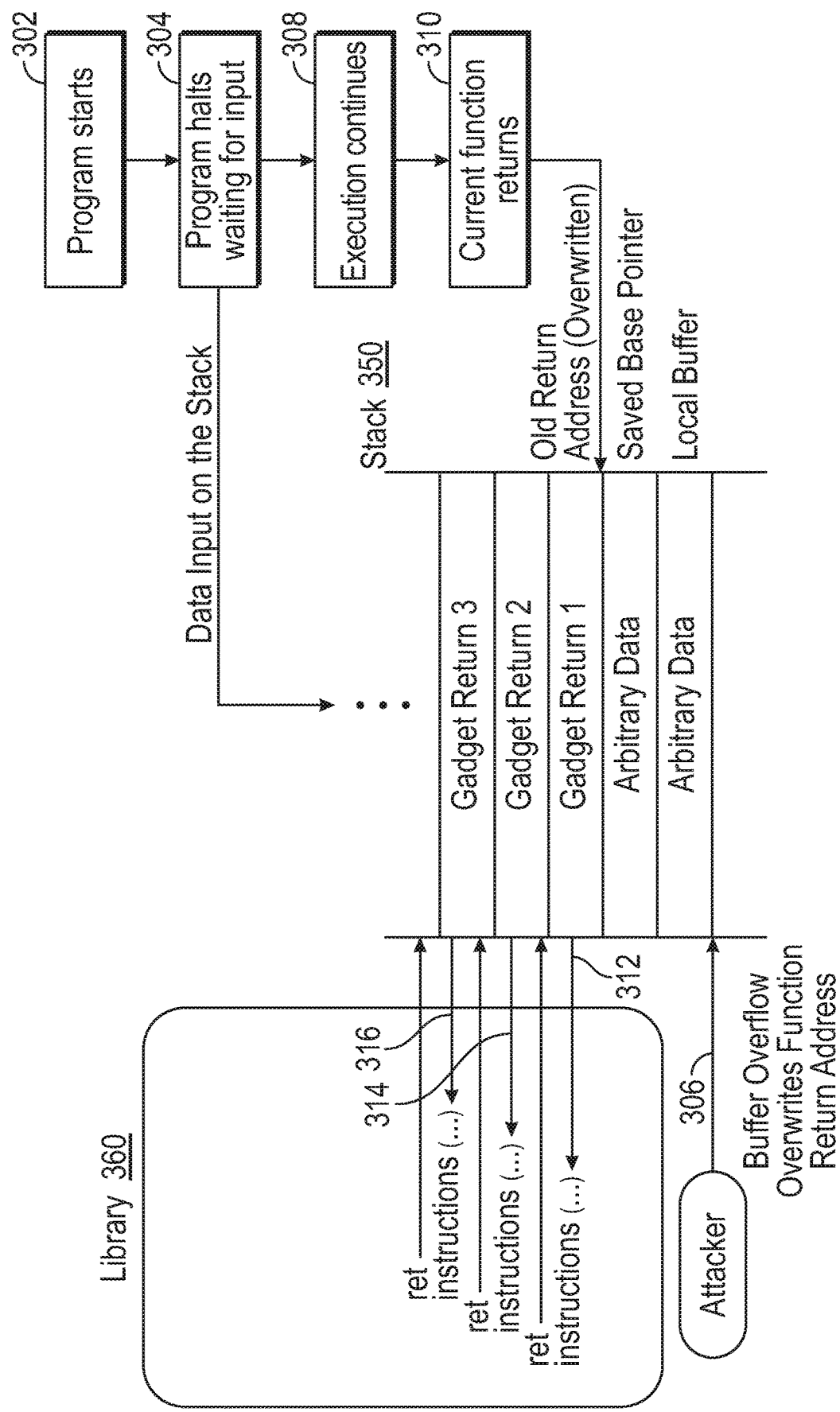
FIG. 3 illustrates an example of a return oriented programming attack, according to one embodiment.

FIG. 3 illustrates one reference example of an ROP attack, according to one embodiment. In this reference example, the application 102 starts at 302 and waits for user input at 304 (e.g., the application 102 may call a function that requires user input). Here, at 304, the application 102 may have a known vulnerability (e.g., the application is susceptible to a buffer overflow in the call stack). At 306, a malicious actor exploits this vulnerability and overwrites the stack 350 with arbitrary data. As shown, in this case, the buffer overflow overwrites the return address of the called function and subsequent stack areas with memory addresses of interest.

At 308, the execution of the application 102 continues, and at 310, the current function returns. However, instead of jumping to the previous return address associated with the current function, the application 102 instead jumps to the address of a first gadget (within the library 360, which is in the memory of the application 102) and executes instructions associated with the first gadget at 312. When the return instruction of the first gadget is executed, the application 102 jumps to the address of a second gadget (within the library 360), and executes instructions associated with the second gadget at 314. When the return instruction of the second gadget is executed, the application 102 jumps to the address of a third gadget (within the library 360), and executes instructions associated with the third gadget at 316. In this process, each gadget is invoked via a return (e.g., ret) function and each gadget ends with a return function, which points to the next gadget. The malicious actor can pass the arguments of the gadgets inside the library 360 via the stack 350.

This process can continue in this manner until the malicious actor has achieved their goal. For example, a malicious actor can use this ROP attack to impose arbitrary ordering to function execution in order to open doors (e.g., opening a root shell on Unix) that can be exploited by the malicious actor. Further, the ROP attack depicted in FIG. 3 can be implemented without injecting new code. That is, the ROP attack reuses functions from a library (e.g., library 360, such as libc) in memory and passes arbitrary parameters to the functions on the stack 350.

Embodiments described herein provide techniques that can mitigate ROP attacks, such as the ROP attack depicted in FIG. 3, by leveraging the memory protection key mechanism (e.g., depicted in FIG. 2) supported by the computing system 100. Referring again to FIG. 1, the compiler 104 includes a protection component 110, which is configured to implement one or more techniques described herein for mitigating ROP attacks. Note that FIG. 1 illustrates one possible arrangement of the computing system 100 and that other arrangements of computing systems can be used to implement the techniques described herein. For example, in one embodiment, the compiler 104 may be located on another computing system and can compile source code using the techniques described herein for execution by the computing system 100.

In one embodiment, the protection component 110 can protect CPU instructions of an application 102 with one or more protection keys 124 during compilation time in order to protect the application 102 against ROP attacks, e.g., when executed on the computing system 100. For example, when compiling source code of an application 102, the protection component 110 can allocate "high-risk" functions that are susceptible to being used as gadgets to page frames within memory 122 that are protected with one or more protection keys 124. In one embodiment, the protection component 110 can determine that a function is "high-risk"

based on a pre-configured list of functions received from a developer (e.g., a developer of the application 102).

While compiling the source code, the protection component 110 can also assign a protection tag 112 to each of the "high-risk" functions that is protected with a given protection key 124. Each protection tag 112 is associated with a particular page frame that is protected with a protection key 124. In one embodiment described in more detail below, the protection component 110 can use the protection tags 112 to define the proper execution order of the functions within the source code of the application 102, such that functions of the application 102 will only execute if the page frame in which the function is located has the proper tag order.

Figure 4:
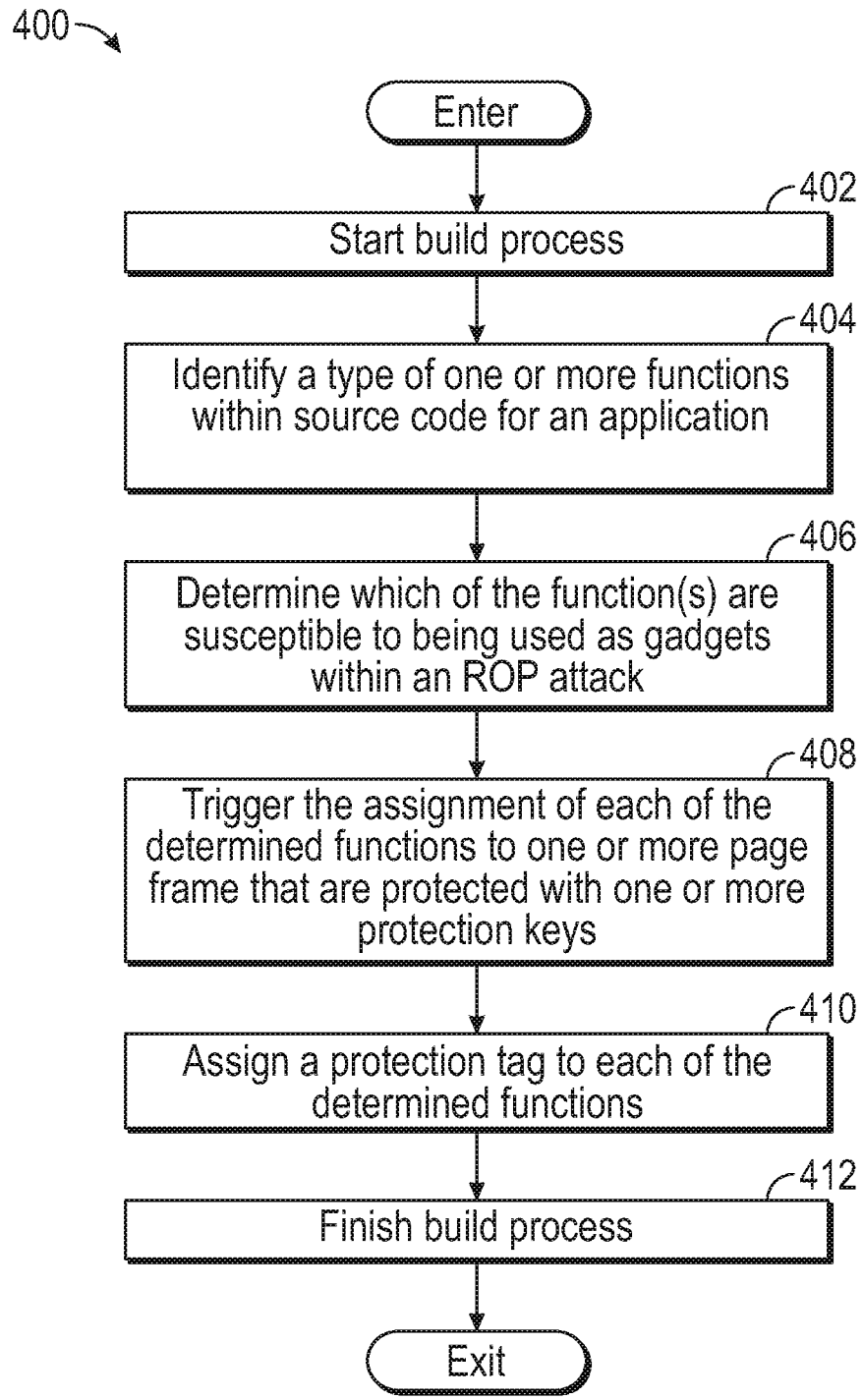
FIG. 4 is a flowchart of a method for mitigating against a return oriented programming attack, according to one embodiment.

FIG. 4 is a flowchart of a method 400 for mitigating against ROP attacks, according to one embodiment. The method 400 may be performed by a compiler (e.g., compiler 104). In one embodiment, the method 400 may be performed during compile time (e.g., prior to runtime or execution) of the application 102.

The method 400 may enter at block 402, where the compiler starts the build phase. At block 404, the compiler identifies a type of one or more functions within the source code. At block 406, the compiler determines which types of functions within the source code are "high-risk" functions that are susceptible to being used as gadgets. Examples of "high-risk" functions can include functions that are susceptible to buffer overflow attacks (e.g., copy functions, move functions, etc.). In one embodiment, the compiler can determine the set of "high-risk" functions based on a predetermined list of such functions received from the developer. In another embodiment, the compiler can analyze or evaluate information associated with the source code (e.g., a set of developer guidelines) received from a developer of the source code to determine the set of "high-risk" functions. For example, the developer guidelines may indicate which types of functions should be allocated on different page frames, in order to protect the functions from being used as gadgets in an ROP attack.

At block 408, the compiler triggers the assignment of each of the set of "high-risk" functions to one or more page frames that are protected with one or more protection keys 124. In one embodiment, the compiler can trigger the assignment by instructing (or requesting) a page frame allocator (e.g., page frame allocator 118) to allocate the set of "high-risk" functions to one or more page frames protected with one or more protection keys 124. Once assigned, the compiler assigns a protection tag 112 to each function in the set of "high-risk" functions (block 410). In one embodiment, the compiler can use a system call (e.g., pkey_alloc flag( )) via the system call interface 116 to assign each protection tag 112. The assignment of a protection tag 112 to a given function modifies the function prologue and epilogue to include the protection tag 112. The compiler specifies the order in which the functions in the source code are to be executed via the set of protection tags 112. Once the protection tags 112 are assigned, the compiler can finish the build process (block 412), and the method 400 exits.

Figure 5:
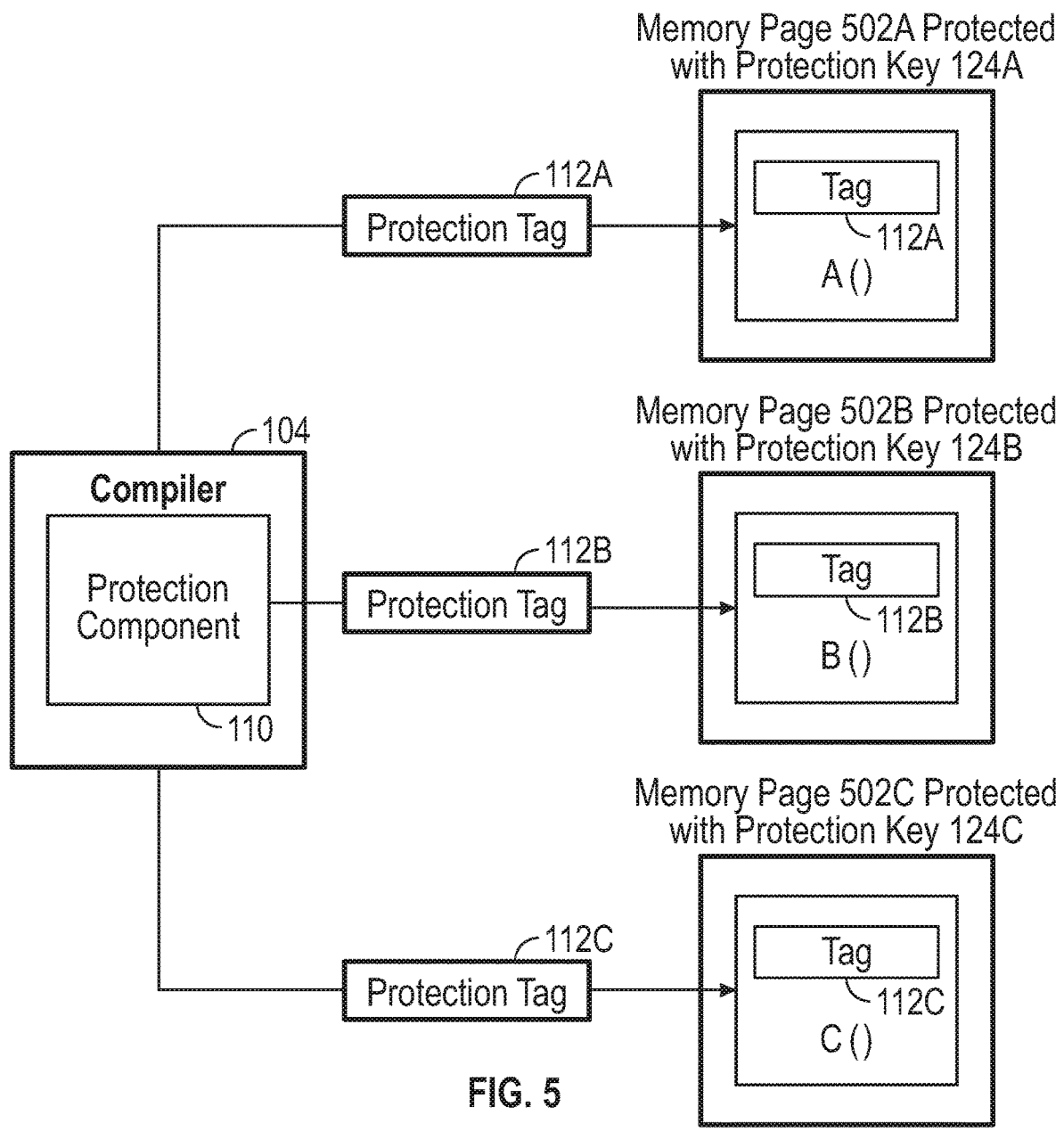
FIG. 5 illustrates an example of functions allocated to protected page frames, according to one embodiment.

FIG. 5 illustrates an example of functions allocated to page frames protected with protection keys 124, according to one embodiment. In this embodiment, the compiler 104 assigns three different functions, A( ), B( ), and C( ), to three different page frames 502A, 502B, and 502C, respectively. Each page frame 502A, 502B, and 502C is protected with a respective protection key 124A, 124B, and 124C. As shown, the compiler 104 also assigns protection tags 112A, 112B, and 112C to the functions AO, BO, and CO, respectively. Each protection tag 112 maps to one of the protection keys 124. As noted, the compiler 104 can use the set of protection tags 112 to control which functions of the application 102 are executed and/or define the order in which the "high-risk" functions of the application 102 are executed. For example, since the compiler 104 processes the order of legitimate functions with the protected keys 124, the functions can execute only if each page frame has the proper tag order. In this manner, if a malicious actor attempts to change the function call ordering, the application 102 can halt because the function call does not contain the correct protection key.

Note that while FIG. 5 depicts three functions allocated to three different protected page frames, in other embodiments, the functions that are identified as "high-risk" can be allocated to protected page frames in different ways. For example, in some embodiments, multiple functions can be allocated to the same protected page frame. In these embodiments, each of these functions may be assigned a protection tag 112 that maps to the same protection key 124. In other embodiments, there may be multiple functions assigned to a same page frame that is protected with multiple protection keys 124. For example, in these embodiments, different memory ranges (or regions) within the page frame may be protected with a different protection key 124, and one or more functions may be assigned (or allocated) to the different memory regions.

Figure 6:
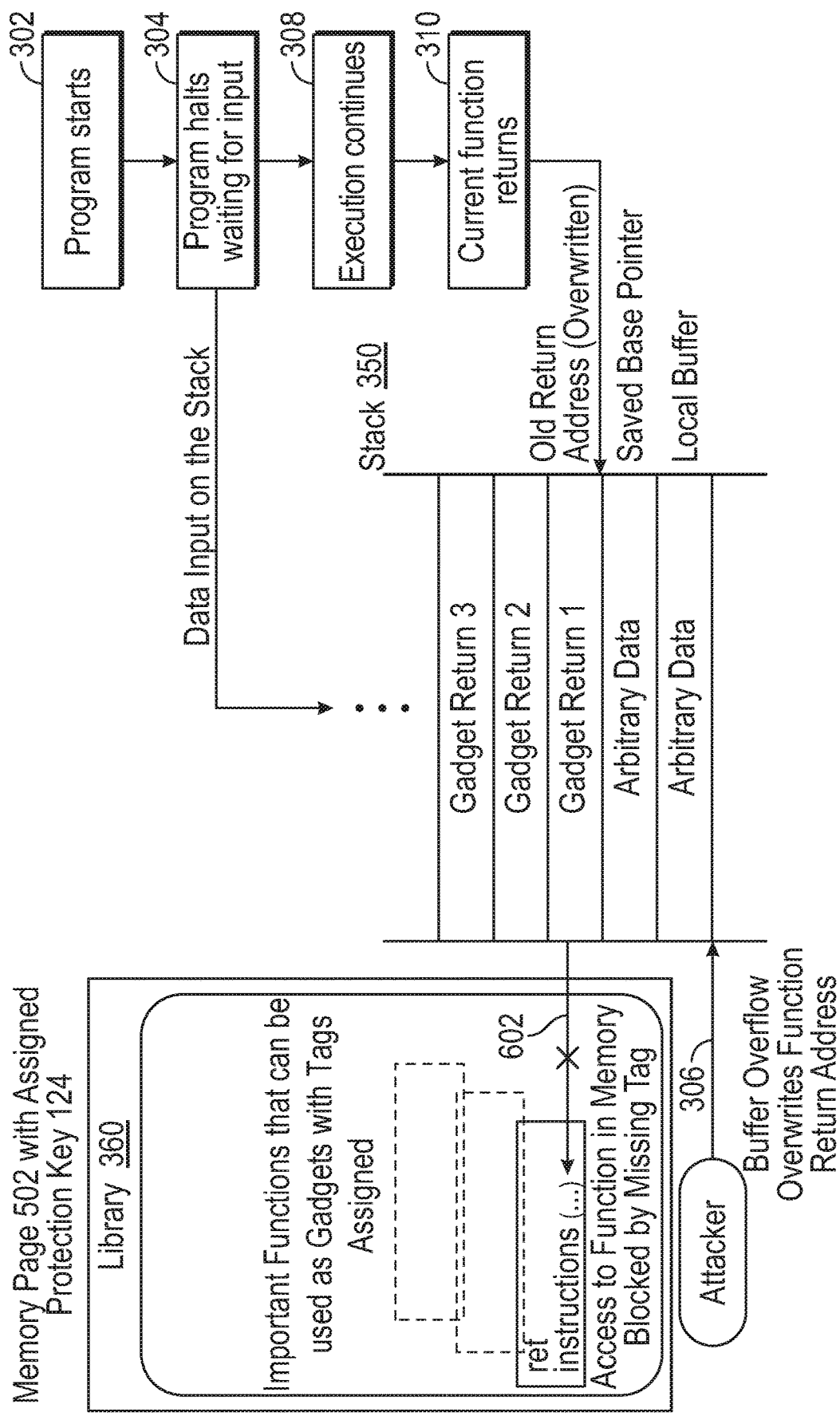
FIG. 6 illustrates an example of mitigating an ROP attack on an application, according to one embodiment.

Consider the example scenario depicted in FIG. 6 of an ROP attack on an application 102, which has been compiled using the ROP mitigation techniques described herein. Similar to the ROP attack in FIG. 3, in this ROP attack, a malicious actor exploits a vulnerability (e.g., a buffer overflow) in the application at 306 (e.g., after the program starts at 302 and halts waiting for input at 304). In particular, the malicious actor causes a buffer overflow on the stack 350, which overwrites the return address of the called function with the address of a gadget within the library 360 of memory page 502. In this embodiment, however, when the corrupted return address tries to call the gadget in memory at 602, the execution is halted because the called function is tagged and the function call does not provide a correct protection tag 112 (the protection tag 112 that is associated with the protection key 124 for memory page 502). In this manner, embodiments provide a secure mechanism that can be fully implemented by the compiler and that is transparent to the user and developer. In addition, embodiments can implement the techniques described herein with minimal overhead (e.g., relative to the overhead associated with conventional techniques) and without requiring refactoring of source code.

Figure 7:
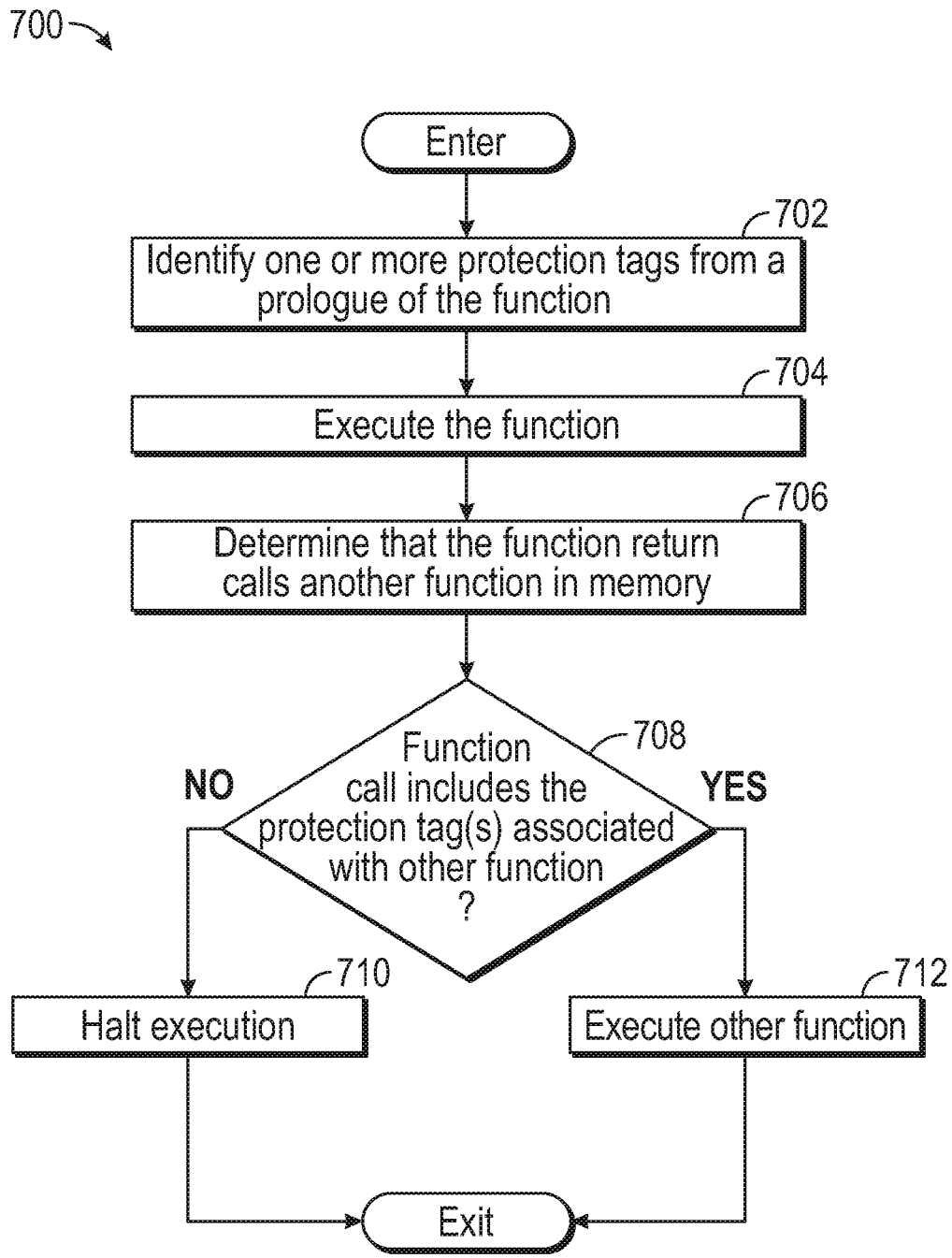
FIG. 7 is a flowchart of a method for executing an application, according to one embodiment.

FIG. 7 is a flowchart of a method 700 for executing an application (e.g., application 102) compiled by a compiler (e.g., compiler 104), according to one embodiment. The method 700 may be performed by one or more components (e.g., processor(s) 120) of the computing system 100.

The method 700 may enter at block 702, where the computing system 100 identifies one or more protection tags (e.g., protection tags 112) from a prologue of a (first) function associated with the application. As noted, the protection tags are associated with functions that are located within memory pages protected with one or more protection keys (e.g., protection keys 124). At block 704, the computing system 100 begins executing the function. In one embodiment, for example, the computing system 100 may pause for user input or perform another operation. In some cases, during the execution, a malicious actor may exploit a vulnerability within the application and cause a buffer overflow that overwrites the return address of the first function with the address of another (second) function (or gadget) in memory. At block 706, for example, the computing system 100 determines that the function return calls another function in memory.

At block 708, the computing system 100 determines whether the function return call includes the protection tag(s) associated with the other function. If the function return call does not include the relevant protection tag(s), then the computing system 100 halts execution, blocking access to the other function (block 710). If the function return call does include the relevant protection tag(s), then the computing system 100 executes the other function (block 712). The method 700 then exits. In one embodiment, the computing system may perform repeat the operations in 702, 704, 706, and 708 as part of performing the operations in 712.

Figure 8:
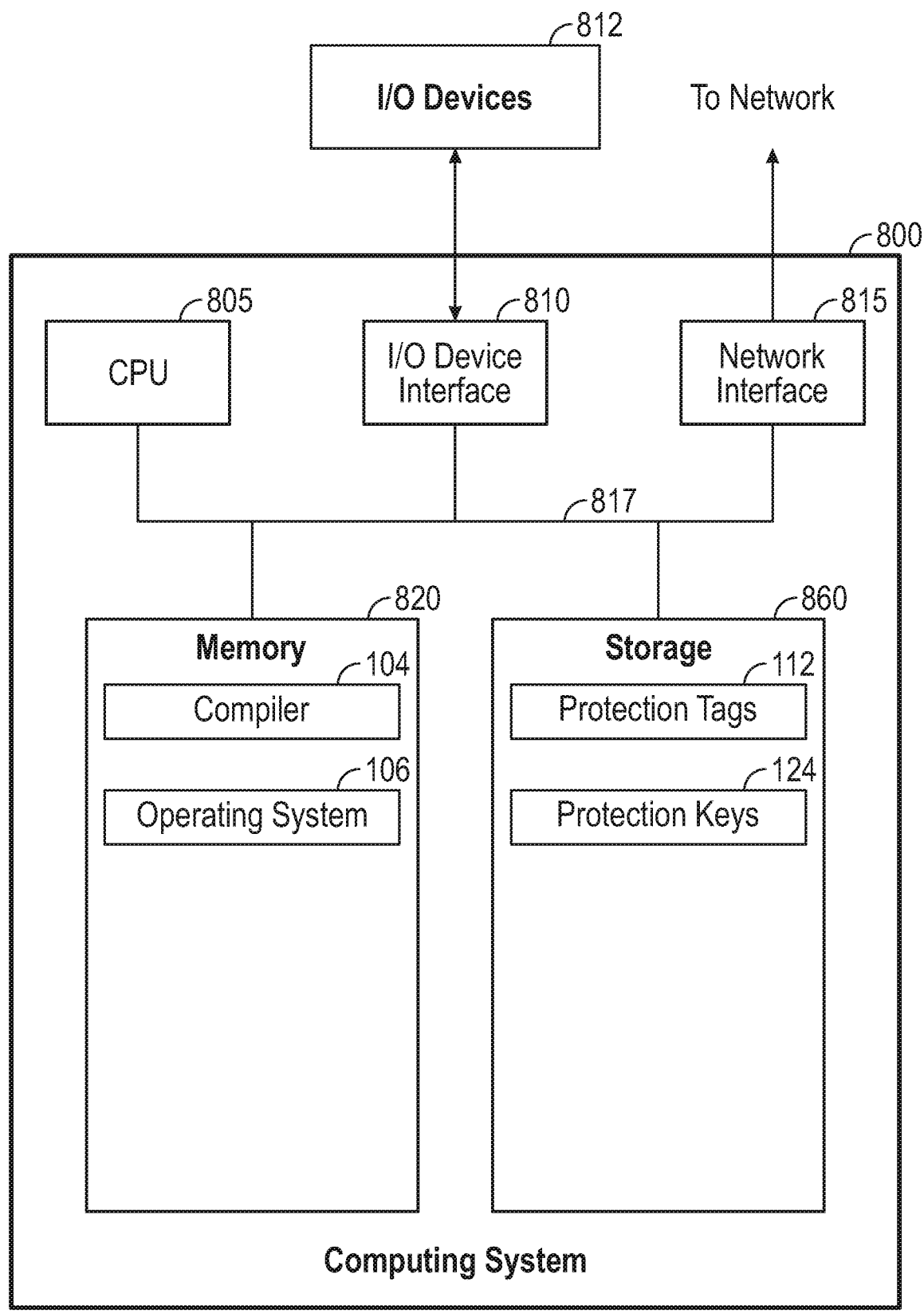
FIG. 8 illustrates an example computing system configured to mitigate against an ROP attack on an application, according to one embodiment.

FIG. 8 illustrates a computing system 800 configured to perform device onboarding, according to one embodiment. As shown, the computing system 800 includes, without limitation, a central processing unit (CPU) 805, a network interface 815, a memory 820, and storage 860, each connected to a bus 817. The computing system 800 may also include an I/O device interface 810 connecting I/O devices 812 (e.g., keyboard, mouse, and display devices) to the computing system 800. Further, in context of this disclosure, the computing elements shown in the computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 820. The interconnect 817 is used to transmit programming instructions and application data between CPU 805, I/O devices interface 810, storage 860, network interface 815, and memory 820. Note CPU 805 is included to be representative of a single CPU, multiple CPUs, a single CPU having multiple processing cores, and the like. Memory 820 is generally included to be representative of a random access memory. The storage 860 may be a disk drive storage device. Although shown as a single unit, storage 860 may be a combination of fixed and/or removable storage devices, such as fixed disc drives, removable memory cards, or optical storage, network attached storage (NAS), or a storage area-network (SAN). The storage 860 includes protection tags 112 and protection keys 124, which are described in more detail above. Illustratively, the memory 820 includes the compiler 104 and the operating system 106, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., compiler 104) or related data available in the cloud. For example, the compiler 104 could execute on a computing system in the cloud and compile source code for an application (e.g., application 102) using one or more of the ROP mitigation techniques described herein. In such a case, the compiler 104 could identify "high-risk" functions in source code of an application, trigger the assignment of those "high-risk" functions to memory pages protected with one or more protection keys, and assign protection tags to the "high-risk" functions. The application 102 can then be stored for later retrieval by a computing system. For example, the computing system, when executing the application, can then determine whether a given function can be accessed in memory, based on whether the function includes the relevant protection tags. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for mitigating against return-oriented programming (ROP) attacks that occur during execution of an application, the computer-implemented method comprising:
   receiving source code to compile into an executable application;
   determining, during a compilation of the source code, one or more functions within the source code that are associated with gadgets in an ROP attack;

assigning, during the compilation of the source code, each of the one or more functions to one or more protected pages of memory for the executable application; and assigning, during the compilation of the source code, a tag to each of the one or more functions, wherein the tag for each function maps to the protected page of memory to which the function is assigned.

2. The computer-implemented method of claim 1, wherein determining the one or more functions within the source code that are associated with gadgets in the ROP attack comprises receiving a list of the one or more functions that are associated with gadgets in the ROP attack from a developer of the source code.

3. The computer-implemented method of claim 1, wherein determining the one or more functions within the source code that are associated with gadgets in the ROP attack comprises:
   determining one or more types of functions that can be used as gadgets in the ROP attack, based on an evaluation of information associated with the source code received from a developer of the source code; and
   determining that each of the one or more functions is one of the determined types of functions that can be used as gadgets in the ROP attack.

4. The computer-implemented method of claim 1, further comprising, during an execution of the executable application:
   determining that a function return of a first function of the executable application calls a second function in memory for the executable application; and
   upon determining that the function return does not include the tag associated with the second function, halting the execution of the executable application.

5. The computer-implemented method of claim 1, wherein assigning the tag to each of the one or more functions comprises, for each of the one or more functions, modifying at least one of a prologue of the function and an epilogue of the function to include a reference to the tag.

6. The computer-implemented method of claim 1, wherein assigning each of the one or more functions to the one or more protected pages of memory comprises assigning each function to a different protected page of memory.

7. The computer-implemented method of claim 1, wherein assigning each of the one or more functions to the one or more protected pages of memory comprises assigning a plurality of functions within the source code to a same protected page of memory.

8. A system, comprising:
   at least one processor; and
   a memory storing one or more applications, which when executed by the processor, performs an operation for mitigating against return-oriented programming (ROP) attacks that occur during execution of an application, the operation comprising:
   receiving source code to compile into an executable application;
   determining, during a compilation of the source code, one or more functions within the source code that are associated with gadgets in an ROP attack;
   assigning, during the compilation of the source code, each of the one or more functions to one or more protected pages of memory for the executable application; and
   assigning, during the compilation of the source code, a tag to each of the one or more functions, wherein the tag for each function maps to the protected page of memory to which the function is assigned.

9. The system of claim 8, wherein determining the one or more functions within the source code that are associated with gadgets in the ROP attack comprises receiving a list of the one or more functions that are associated with gadgets in the ROP attack from a developer of the source code.

10. The system of claim 8, wherein determining the one or more functions within the source code that are associated with gadgets in the ROP attack comprises:
    determining one or more types of functions that can be used as gadgets in the ROP attack, based on an evaluation of information associated with the source code received from a developer of the source code; and
    determining that each of the one or more functions is one of the determined types of functions that can be used as gadgets in the ROP attack.

11. The system of claim 8, the operation further comprising, during an execution of the executable application:
    determining that a function return of a first function of the executable application calls a second function in memory for the executable application; and
    upon determining that the function return does not include the tag associated with the second function, halting the execution of the executable application.

12. The system of claim 8, wherein assigning the tag to each of the one or more functions comprises, for each of the one or more functions, modifying at least one of a prologue of the function and an epilogue of the function to include a reference to the tag.

13. The system of claim 8, wherein assigning each of the one or more functions to the one or more protected pages of memory comprises assigning each function to a different protected page of memory.

14. The system of claim 8, wherein assigning each of the one or more functions to the one or more protected pages of memory comprises assigning a plurality of functions within the source code to a same protected page of memory.

15. A non-transitory computer-readable storage medium having computer-readable program code collectively stored thereon, the computer-readable program code executable by one or more computer processors to perform an operation for mitigating against return oriented programming (ROP) attacks, the operation comprising:
    receiving source code to compile into an executable application;
    determining, during a compilation of the source code, one or more functions within the source code that are associated with gadgets in an ROP attack;
    assigning, during the compilation of the source code, each of the one or more functions to one or more protected pages of memory for the executable application; and
    assigning, during the compilation of the source code, a tag to each of the one or more functions, wherein the tag for each function maps to the protected page of memory to which the function is assigned.

16. The non-transitory computer-readable storage medium of claim 15, wherein determining the one or more functions within the source code that are associated with gadgets in the ROP attack comprises receiving a list of the one or more functions that are associated with gadgets in the ROP attack from a developer of the source code.

17. The non-transitory computer-readable storage medium of claim 15, wherein determining the one or more functions within the source code that are associated with gadgets in the ROP attack comprises:
    determining one or more types of functions that can be used as gadgets in the ROP attack, based on an evaluation of information associated with the source code received from a developer of the source code; and determining that each of the one or more functions is one of the determined types of functions that can be used as gadgets in the ROP attack.

18. The non-transitory computer-readable storage medium of claim 15, the operation further comprising, during an execution of the executable application:

determining that a function return of a first function of the executable application calls a second function in memory for the executable application; and upon determining that the function return does not include the tag associated with the second function, halting the execution of the executable application.

19. The non-transitory computer-readable storage medium of claim 15, wherein assigning the tag to each of the one or more functions comprises, for each of the one or more functions, modifying at least one of a prologue of the function and an epilogue of the function to include a reference to the tag.

20. The non-transitory computer-readable storage medium of claim 15, wherein assigning each of the one or more functions to the one or more protected pages of memory comprises assigning each function to a different protected page of memory.

* * * * *